United States Patent [19]

McVey

[11] Patent Number: 4,459,586

[45] Date of Patent: Jul. 10, 1984

[54] METHOD FOR STRUCTURING HIGH DENSITY DISPLAY FONT FOR DISPLAY DEVICE OF TEXT PROCESSING SYSTEM

[75] Inventor: James M. McVey, Florence, Tex.

[73] Assignee: International Business Machines Corporation, Armonk, N.Y.

[21] Appl. No.: 311,086

[22] Filed: Oct. 13, 1981

[51] Int. Cl.[3] .................................... G06F 3/14

[52] U.S. Cl. .................................... 340/735; 340/748

[58] Field of Search ... 364/900 MS File, 200 MS File; 340/732, 735, 748

[56] References Cited

U.S. PATENT DOCUMENTS

| | | | |
|---|---|---|---|
| 3,678,497 | 7/1972 | Watson et al. | 340/735 |
| 3,895,374 | 7/1975 | Williams | 340/723 |
| 4,057,849 | 11/1977 | Ying et al. | 364/200 |

*Primary Examiner*—Thomas M. Heckler

*Attorney, Agent, or Firm*—Otto Schmid, Jr.

[57] ABSTRACT

A method for structuring a display font for a full page display device for a text processing system in which a text stream input by way of a keyboard is stored and displayed to the operator on a display device including a cathode ray tube, the electron beam of which is modulated and scanned in a series of horizontal traces to produce an image of the text line on the screen of the display device. The method comprises blocking the characters making up the font to the extent that each character is more distinguishable within a word, double dotting the vertical portions of the characters and single dotting the horizontal portions of the characters to provide even brightness characters so that operator eye fatigue is reduced and brightness can be lowered to reduce flicker.

4 Claims, 8 Drawing Figures

METHOD FOR STRUCTURING HIGH DENSITY DISPLAY FONT FOR DISPLAY DEVICE OF TEXT PROCESSING SYSTEM

DESCRIPTION

1. Background of the Invention

This invention relates in general to a display device for an interactive text processing system and more particularly to a method for structuring a display font in a display device for a text processing system which is capable of displaying a full page.

2. Description of the Prior Art

Prior art interactive text processing systems have utilized display devices capable of displaying about 2000 characters. These display devices utilize cathode ray tubes (CRTs), standard raster scan techniques, and standard CRT controllers. These display devices are relatively inexpensive and possess other operational characteristics which make them suitable for use in an interactive text processing system.

As text processing technology has advanced, there has developed the need for a display device to display a full page image. The full page image requires the display of a significantly larger number of characters. To make such a system economically feasible, it would be desirable to use a standard monitor, since any other type of display device would be too costly for an interactive text processing application. A standard fifteen inch monitor has a screen of sufficient size to display a full page image; however, displaying 66 lines of 100 characters on this monitor reduces the character size to less than 2.6 mm total height and limits the aspect ratio, thereby greatly degrading readability. To be suitable for a text processing application, the display device must permit not only reading each word on the page, but also the ability to distinguish each letter in each word. Further contributing to the low level of readability, the characters in the standard single dotted font appear to run together and vertical lines are perceived as dimmer than horizontal lines, giving the character uneven levels of brightness.

SUMMARY OF THE INVENTION

It is accordingly an object of the present invention to provide a method for structuring a display font in a display device for an interactive text processing system suitable for displaying a full page.

It is a further object of the present invention to provide a display font having sufficient readability so that a standard monitor can be used to display a full page in an interactive text processing system.

These and other objects and advantages are achieved with the present display apparatus. Briefly, there is provided a text processing system in which a text stream input by way of a keyboard is stored and displayed to an operator on a display device comprising a cathode ray tube and an electron beam which is modulated and scanned in a series of horizontal traces to produce an image of the text data on the screen of the display device. The display font for the data to be displayed is structured by blocking the characters making up the font so that the characters are distinguishable within a word, double dotting the vertical portions of the characters, and single dotting the horizontal portions of the characters to provide even brightness characters so that operator eye fatigue is reduced and brightness can be lowered to reduce flicker.

DESCRIPTION OF THE INVENTION

Figure 1:
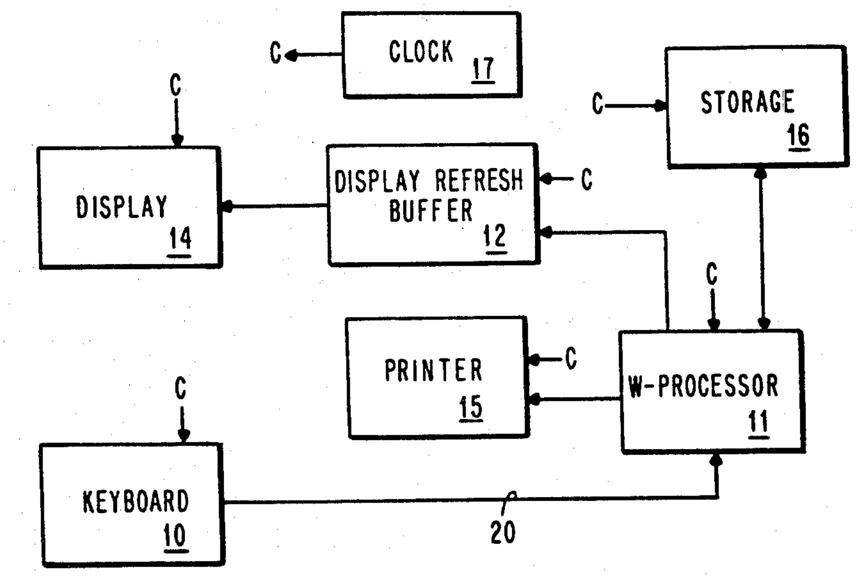
FIG. 1 is a block diagram of an interactive text processing system embodying the present invention.

The invention will now be described as embodied in an interactive text processing system of the type shown in FIG. 1. As shown in FIG. 1, the text processing system illustrated therein comprises a keyboard 10, a microprocessor 11, a display refresh buffer 12, a display device 14, a printer 15, and an auxiliary diskette storage device 16. A clock 17, for keeping the various components of the system in synchronism, is also shown in FIG. 1 and is effectively coupled to each of the units.

Keyboard 10 comprises a normal set of graphic symbol keys such as letters, numbers, punctuation marks, and special character keys, plus text format or control keys like carriage return, indent, etc. In addition, the keyboard includes a second set of control keys for issuing special control commands to the system. The control keys include cursor movement keys, keys for setting the keyboard into a number of different modes, etc.

Figure 2:
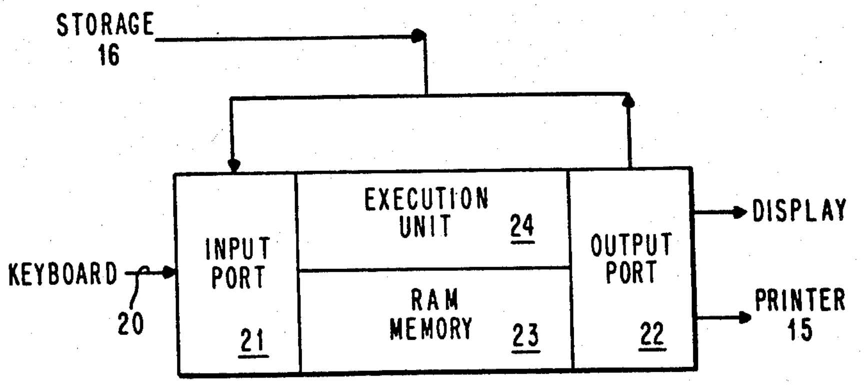
FIG. 2 is a functional diagram of the microprocessor shown in FIG. 1.

The keyboard is connected to the microprocessor by means of a bus 20. The microprocessor, as shown in FIG. 2, comprises an input port 21, an output port 22, a random access memory 23, and a process execution unit 24.

Figure 3:
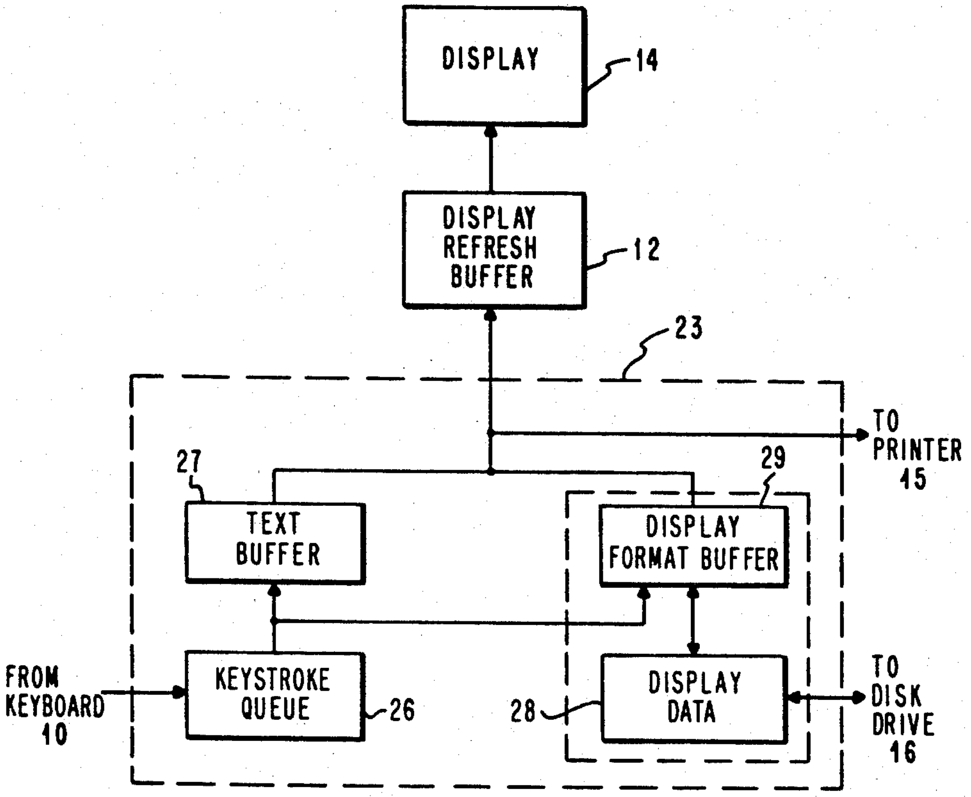
FIG. 3 is a functional diagram illustrating the data flow path between portions of the memory and the microprocessor and the display refresh buffer.

Functionally, memory unit 23 stores both instructions and data in specified sections which will be described in more detail later on in the specification. Data is entered into memory 23 from the keyboard as bytes of binary information through input port 21. As shown in FIG. 3, the section of RAM 23 which receives the keystroke data from the keyboard is designated keystroke queue 26. Data to be displayed is transferred by a series of instructions from queue 26 to the text buffer section 27 and then to the display refresh buffer 12 through output port 22 of the microprocessor 11. This is achieved in a conventional way by the microprocessor executing a series of move instructions.

The microprocessor 11 may be an IBM Series 1, an INTEL model 8086 or any of the recognized functionally equivalent, currently available microprocessors.

The display refresh buffer 12 is shown as a separate buffer connected between the output port 22 and the display device 14. Buffer 12, in practice, is normally a part of the display device 14 and functions to control the generation of characters on the screen of the display device 14 by exercising on-off control of the beam as it traces a series of horizontal lines across the screen.

The output port 22 also supplies data stored in memory 23 to the printer 15 and diskette storage unit 16, each of which may have their own internal buffers which are not shown. Commands to transfer data from the random access memory 23 to the printer 15 or storage unit 16 are sent to the microprocessor 11 by the operator from the keyboard 10.

Printer 15 may be any suitable printer known in the art. In most text processing systems, the printer is basically a standard input/output terminal printer having a type ball element or a daisy-wheel print element.

Diskette storage 16 may also be any suitable disk storage device which is capable of storing serial by byte data supplied to it at determined sector address locations, each of which are randomly addressable by the microprocessor to retrieve the data. Spatially related data supplied to diskette drive 16 is stored in the display data area 28 of the memory 23 in encoded form. The other section of memory 23 shown in FIG. 3 is the display format buffer area 29 which is involved in the handling of spatially related data in decoded form.

Figure 4:
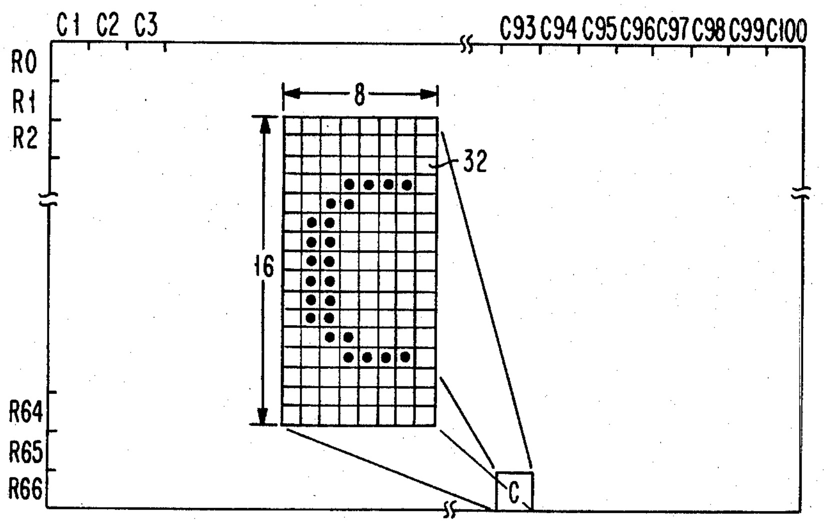
FIG. 4 is a diagrammatic view of the display in FIG. 1.
Figure 8:
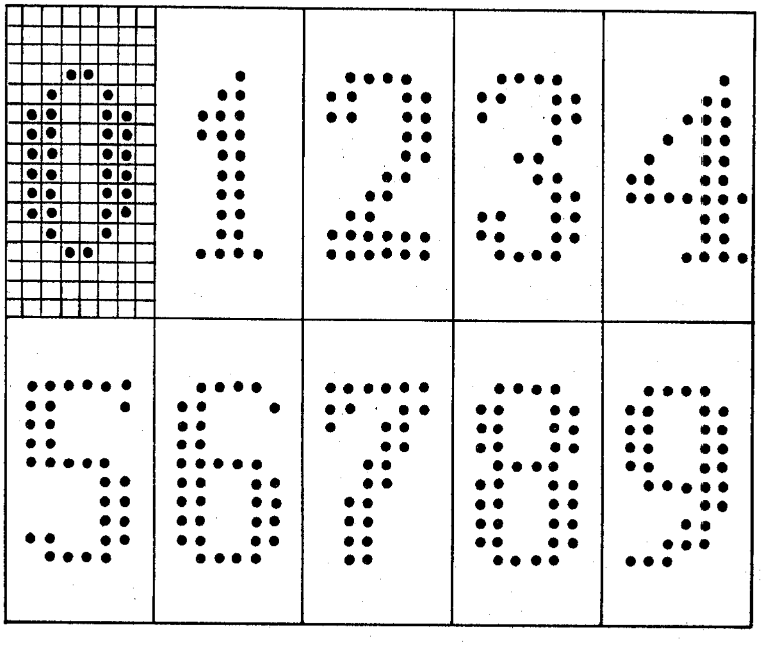
FIG. 8 is a diagram showing the structure of the numeric characters comprising the display font according to the invention.

FIG. 4 is a schematic representation of the screen of display device 14. As shown in FIG. 4, the screen has, for example, the capability of displaying 66 lines of characters where each line consists of 100 character column positions. In practice, one character position consists of a matrix of dot positions or picture elements sometimes referred to as pels. A typical character matrix for a display of the type represented by device 14 would be a matrix of eight wide by sixteen high pels, which has been designated by reference character 32 in FIG. 4. The interaction of the refresh buffer 12 and the display 14 is to convert the characters stored at a location in the buffer 12 to the corresponding character as formed in an $8\times16$ dot matrix at the equivalent location on the display 14. Display 14 generally is provided with its own set of electronics to achieve that conversion. The microprocessor 11 need only supply the address and load the buffer 12 with the appropriate characters.

The diskette storage device 16 also is generally provided with its own set of electronics for converting a byte of data supplied from the display data area 28 of memory 23 through the output port 22 to a serial by bit stream of data to be recorded at a predetermined sector of the one addressed concentric recording track on the diskette. Data from the device 16 is supplied to the microprocessor 11 serial by byte from the addressed sector and storage tracks when requested.

It will be understood that all of the above described functions and interactions involving the microprocessor 11 are achieved through suitable programs which are also stored in memory 23 and which are called into operation in response to data from the keyboard 10 or interrupt signals generated by the various components of the system shown in FIG. 1.

Figure 5:
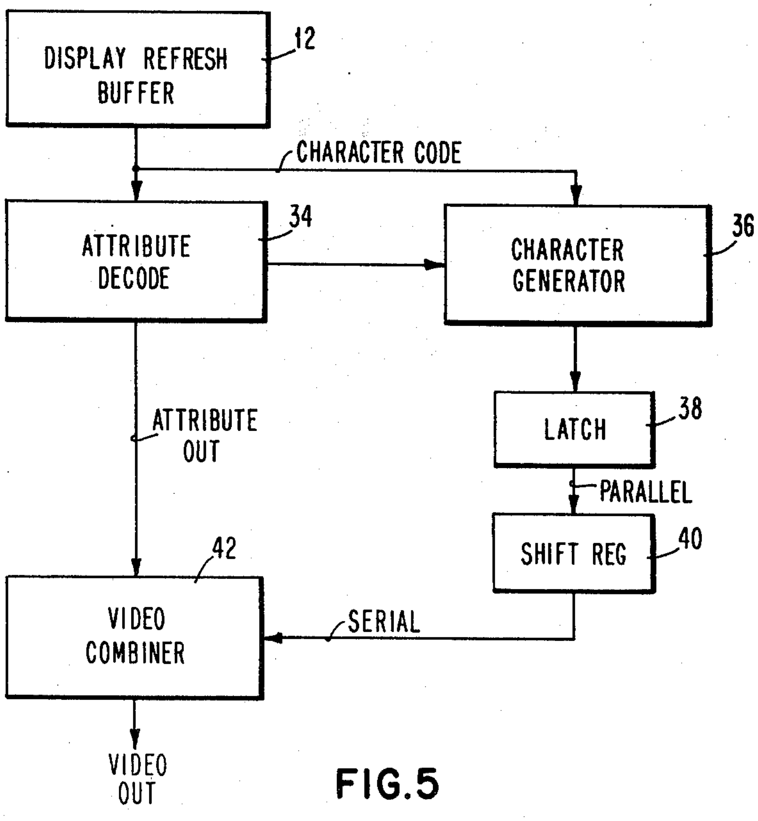
FIG. 5 is a functional diagram of the general data flow path between the refresh buffer and the serial bit stream of text data to the CRT of the display shown in FIG. 1.

FIG. 5 shows the general data flow in display device 14 from the display refresh buffer 12. The data to be displayed includes character (CHAR) and attribute (ATT) information (TEXT) which is stored in display refresh buffer 12 by microprocessor 11 through the dual ported memory interface. The text is fetched by the display logic circuits as a group (byte) of character data and a group (byte) of attribute data. The attribute data for each character is decoded in the attribute decode logic 34 and used along with the scan line address data supplied by the display logic circuits in addressing the character generator 36.

Character generator 36 stores data for all characters in the font in dot matrix format. In the specific embodiment illustrated in FIG. 4, each character is formed in a character box which is eight matrix positions wide and sixteen positions high. Characters are produced in visual form on the display screen in a series of successive horizontal traces (scan lines). Each horizontal trace produces the corresponding one of the sixteen horizontal slices of each character on that text line so a total of sixteen horizontal traces is required to display one line of text.

Character font data read out of the character generator is coupled to latch means 38 and latched so that it can be loaded into a parallel to serial converter such as shift register 40 at the correct character interval. The character data is shifted out of shift register 40 serially and the serial character data out of the shift register is synchronized with the corresponding attribute data for that character from attribute logic circuits 34 in video combiner 42 to provide the video input to the CRT.

As previously stated above, there is a problem in readability of the display characters produced in a full page display when using the standard single dotted character font. The characters are perceived to bleed or run together, and vertical lines of dots are perceived as dimmer than horizontal lines of dots which gives the characters uneven levels of brightness.

Figure 6:
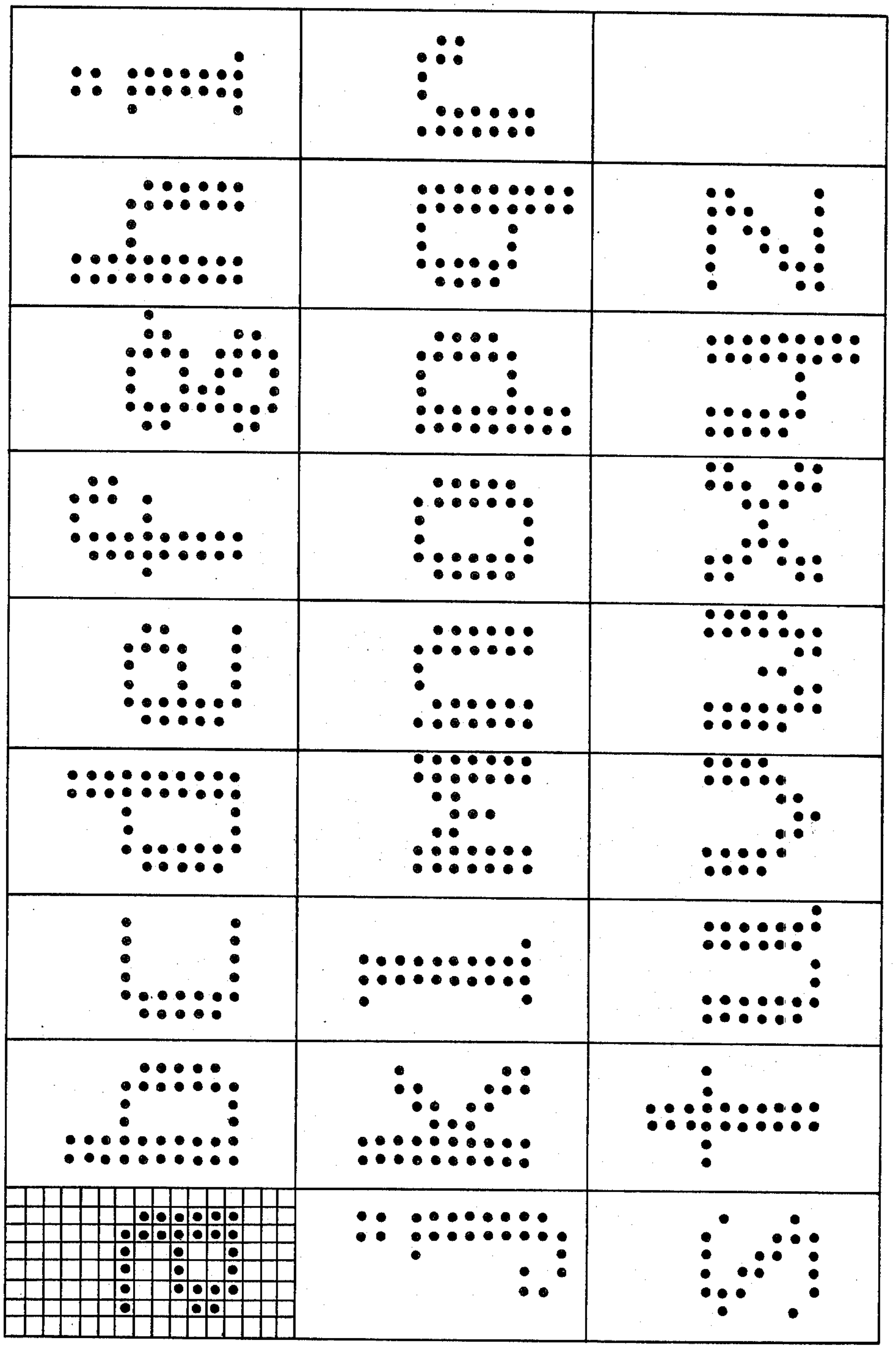
FIG. 6 is a diagram showing the structure of the lower case alphabetic characters comprising the display font according to the invention.
Figure 7:
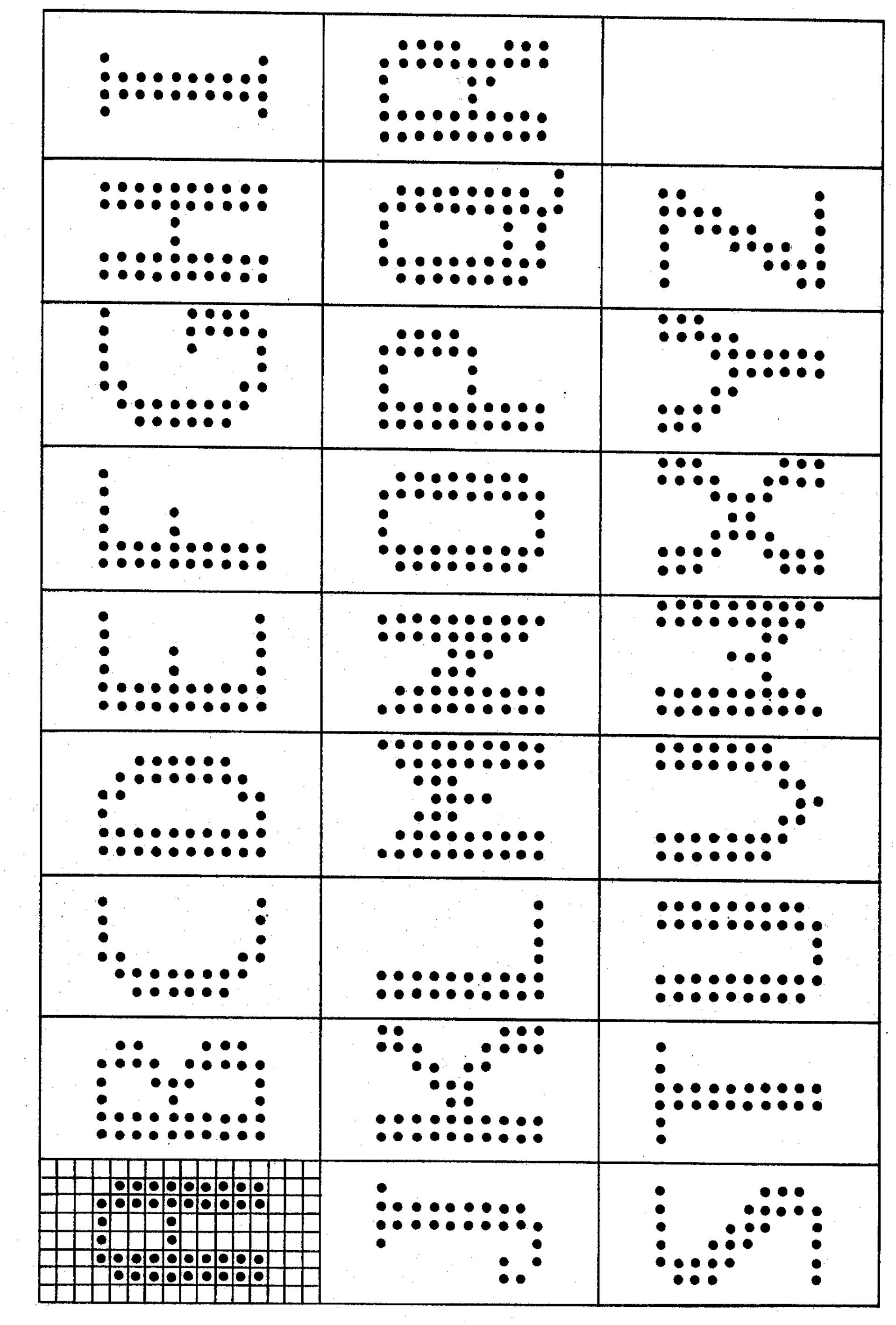
FIG. 7 is a diagram showing the structure of the upper case alphabetic characters comprising the display font according to the invention.

The improved character font according to the present invention uses a block font style. The block font style is implemented by eliminating all serifs on all characters. In a dense display environment, the serifs are perceived to fill the curves formed by preceding or succeeding characters thereby contributing to the appearance of characters bleeding or running together. In addition, the implementation of the block font style includes the addition or deletion of dots as needed to "square up" rounded character edges to make each character easier to identify in a character sequence. Specific examples of changes in the font to produce a block style font include the lower case a, b, c, d, e, g, h as shown in FIG. 6. In addition, the upper case C, G and S as shown in FIG. 7, and numbers 3, 8, and 9 have been changed to a block style font.

The introduction of the block style font partially solved the problems encountered in the full page display. To further enhance the readability of the font, all vertical character lines (where possible) were double dotted. This design produced an increased character brightness while correcting the uneven brightness levels mentioned previously. As a further font enhancement, the horizontal portions of the character are single dotted rather than also double dotting the horizontal portion of the character since the horizontal portions are perceived as brighter and for this reason, double dotting the horizontal portions of the character would retain the uneven levels of brightness previously encountered. In addition, dots were added to the curved and diagonal portions of the characters to produce a smoother appearance due to the high dot density of the curved and diagonal portions of the characters.

Test results have shown that the high density block style font described here has exceptional readability even at reduced monitor brightness levels. Due to the larger number of dots used and their placement, the characters are sharper with more contrast. In addition, the characters are perceived to be approximately 30% larger than a single dotted character of the same height. With these operational characteristics, a display device using this character font for a full page display can be operated at a reduced monitor brightness level. This mode of operation produces greater display tube life, less perceived flicker in the display, and reduced operator eye fatigue.

While the invention has been particularly shown and described with reference to a preferred embodiment thereof, it will be understood by those skilled in the art that various other changes in the form and details may be made therein without departing from the spirit and scope of the invention.

Having thus described my invention, what I claim as new and desire to secure by Letters Patent is:

1. In an interactive text processing system in which text data input by way of a keyboard is displayed to an operator, a method for structuring a display font in which characters are formed by a matrix of dots, said method comprising:

blocking the characters making up the font by the addition or deletion of dots to the character edges to produce a more square character appearance so that each character is distinguishable within a word;

smoothing the characters by the addition of dots to the curved and diagonal portions of the characters;

double dotting all vertical portions of the characters; and single dotting all horizontal portions of the characters to provide even brightness characters so that operator eye fatigue is reduced and brightness can be lowered to reduce flicker.

2. The method recited in claim 1 in which said dots forming the vertical portions of the characters are equally spaced.

3. The method recited in claim 1 in which said dots forming the horizontal portions of the characters are equally spaced.

4. The method recited in claim 1 in which said dots forming the horizontal portions of the characters and the dots forming the vertical portions of the characters are equally spaced.

* * * * *